United States Patent
Wels et al.

(10) Patent No.: US 9,805,473 B2
(45) Date of Patent: Oct. 31, 2017

(54) METHOD AND SYSTEM FOR SEGMENTATION OF BRAIN STRUCTURES IN 3D MAGNETIC RESONANCE IMAGES

(75) Inventors: Michael Wels, Bamberg (DE); Gustavo Henrique Monteiro de Barros Carneiro, Lisbon (PT); Martin Huber, Uttenreuth (DE); Dorin Comaniciu, Princton Junction, NJ (US); Yefeng Zheng, Dayton, NJ (US)

(73) Assignee: Siemens Healthcare GmbH, Erlangen (DE)

(*) Notice: Subject to any disclaimer, the term of this patent is extended or adjusted under 35 U.S.C. 154(b) by 2478 days.

(21) Appl. No.: 12/558,736

(22) Filed: Sep. 14, 2009

(65) Prior Publication Data

US 2010/0074499 A1 Mar. 25, 2010

Related U.S. Application Data

(60) Provisional application No. 61/098,273, filed on Sep. 19, 2008.

(51) Int. Cl.
*G06T 7/143* (2017.01)
*G06T 7/11* (2017.01)

(52) U.S. Cl.
CPC .......... *G06T 7/143* (2017.01); *G06T 7/11* (2017.01); *G06T 2207/10088* (2013.01); *G06T 2207/30016* (2013.01)

(58) Field of Classification Search
CPC ......... G06T 2207/10088; G06T 7/0083; G06T 2207/10081; A61B 5/055; A61B 6/03; G06K 2209/05

USPC .................................................. 382/128
See application file for complete search history.

(56) References Cited

U.S. PATENT DOCUMENTS

| | | | | |
|---|---|---|---|---|
| 5,751,838 A | * | 5/1998 | Cox | G06T 7/2033 348/155 |
| 7,136,516 B2 | | 11/2006 | Alyassin | |
| 8,068,654 B2 | * | 11/2011 | Barbu | G06K 9/00201 345/419 |
| 2005/0244036 A1 | * | 11/2005 | Rusinek | G06T 7/0012 382/120 |
| 2005/0283054 A1 | * | 12/2005 | Reiman | G01N 33/5088 600/300 |
| 2007/0160277 A1 | | 7/2007 | Slabaugh et al. | |
| 2008/0298659 A1 | * | 12/2008 | Spence | G06K 9/4647 382/131 |
| 2008/0306379 A1 | * | 12/2008 | Ikuma | A61B 5/06 600/424 |
| 2009/0030304 A1 | | 1/2009 | Feiweier et al. | |

(Continued)

OTHER PUBLICATIONS

Cootes T.F. et al., "Active Shape Models—Their Training and Application", Computer Vision and Image Understanding, 61(1), Jan. 1995, pp. 38-59.

(Continued)

*Primary Examiner* — Reginald R Reyes (57) ABSTRACT

A method and system for segmenting multiple brain structures in 3D magnetic resonance (MR) images is disclosed. After intensity standardization of a 3D MR image, a meta-structure including center positions of multiple brain structures is detected in the 3D MR image. The brain structures are then individually segmented using marginal space learning (MSL) constrained by the detected meta-structure.

24 Claims, 5 Drawing Sheets

(56) References Cited

U.S. PATENT DOCUMENTS

2009/0316988 A1* 12/2009 Xu ..................... G06K 9/6256
382/173
2010/0020208 A1* 1/2010 Barbu ..................... G06K 9/40
348/250

OTHER PUBLICATIONS

Cox, I.J. et al., "Dynamic Histogram Warping of Images Pairs for Constant Image Brightness", In IEEE International Conference on Image Processing, vol. II, Washington D.C., USA, Oct. 1995.
Georgescu, B. et al., "Database-Guided Segmentation of Anatomical Structures with Complex Appearance", In IEEE Comp. Soc. Conf. Comp. Vis. Pat. Recog., San Diego, CA, USA, Jun. 2005.
Gower, J.C., Generalized Procrustes Analysis, Psychometrika 40(1), Mar. 1975, pp. 33-50.
Tu, Z., "Probabilistic Boosting-Tree: Learning and Discriminative Models for Classification, Recognition, and Clustering", in IEEE Int'l. Conf. Comp. Vis., Beijing, China, Oct. 2005, pp. 1589-1596.
Zheng, Y., et al., "Four-Chamber Heart Modeling and Automatic Segmentation for 3D Cardiac CT Volumes Using Marginal Space Learning and Steerable Features", IEEE Transactions on Medical Imaging, 27(11), Nov. 2008, pp. 1668-1681.

\* cited by examiner

METHOD AND SYSTEM FOR SEGMENTATION OF BRAIN STRUCTURES IN 3D MAGNETIC RESONANCE IMAGES

This application claims the benefit of U.S. Provisional Application No. 61/098,273, filed Sep. 19, 2008, the disclosure of which is herein incorporated by reference.

BACKGROUND OF THE INVENTION

The present invention relates to medical imaging of the brain, and more particularly, to automatic segmentation of sub-cortical and cortical brain structures in 3D magnetic resonance images.

Detection and delineation of sub-cortical and cortical brain structures in magnetic resonance (MR) data is an important problem in medical imaging analysis. For example, delineated sub-cortical and cortical brain structures can be used in detecting abnormal brain patterns, studying various brain diseases, and studying brain growth. Manual delineation of such sub-cortical and cortical brain structures in 3D MR data is a challenging task, ever for expert users, such as clinicians or neuroanatomists. Task-specific protocols for manual brain structure annotation exist, but the correct utilization of such protocols depends heavily on user experience. Moreover, even for experienced users, the manual delineation of a single brain structure is a time-consuming process, and manual annotations may vary significantly among experts as a result of individual experience and interpretation. Accordingly, a method for automatically segmenting sub-cortical and cortical brain structures in MR volumes is desirable.

Conventional techniques for segmenting sub-cortical and cortical brain structures cannot be used for purposes such as detecting abnormal brain patterns, studying brain diseases, and studying brain growth due to a lack of proper generalization. In particular, conventional methods may successfully perform segmentation of sub-cortical and cortical brain structures in MR data for healthy adult brains, but cannot reliably detect abnormal brain structures or brain structures in pediatric brains. The generalization of such conventional methods for the detection of abnormal brain structures is not trivial, and it has been necessary to develop specific methods that only work for specific cases. Accordingly, a method for sub-cortical and cortical brain structure segmentation that is robust enough to reliably segment abnormal brain structures and pediatric brain structures, as well as healthy adult brain structures is desirable.

BRIEF SUMMARY OF THE INVENTION

The present invention provides a method and system for segmenting sub-cortical and cortical brain structures in 3D MR images. For example, embodiments of the present invention provide automatic segmentation of the brain structures of the left and right caudate nucleus, hippocampus, globus pallidus, putamen, and amygdala.

In one embodiment, a meta-structure including center positions of multiple brain structures is detected in a 3D MR image. At least one of the brain structures is then individually segmented using marginal space learning (MSL) constrained by the detected meta-structure. The MSL framework for individually detecting the brain structures can be extended to include shape inference in addition to position detection, position-orientation detection, and full similarity transformation detection.

These and other advantages of the invention will be apparent to those of ordinary skill in the art by reference to the following detailed description and the accompanying drawings.

DETAILED DESCRIPTION

The present invention is directed to a method and system for automatic segmentation of sub-cortical and cortical brain structures in 3D magnetic resonance (MR) images. Embodiments of the present invention are described herein to give a visual understanding of the sub-cortical and cortical brain structure segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention are directed to automated (sub)-cortical brain structure segmentation in 3D MR images. As used herein, a "(sub)-cortical brain structure" refers to any sub-cortical and/or cortical brain structure. For example, embodiments of the present invention segment a set of (sub)-cortical brain structures including the left and right caudate nucleus, hippocampus, globus pallidus, putamen, and amydgala. Embodiments of the present invention utilize a top-down segmentation approach based on Marginal Space Learning (MSL) to detect such (sub)-cortical brain structures. MSL decomposes the parameter space of each respective anatomic structure along decreasing levels of geometrical abstraction into subspaces of increasing dimensionality by exploiting parameter invariance. At each level of abstraction, i.e., in each subspace, strong discriminative models are trained from annotated training data, and these models are used to narrow the range of possible solutions until a final shape of the brain structure can be inferred. The basis MSL framework is described in greater detail in Zheng et al., "Four-Chamber Heart Modeling and Automatic Segmentation for 3D Cardiac CT Volumes Using Marginal Space Learning and Steerable Features", IEEE T. Med. Imag. 27(11) (November 2008), pgs. 1668-1681, which is incorporated herein by reference. Contextual shape information for the brain structures is introduced by representing candidate shape parameters with high-dimensional vectors of 3D generalized Haar features and steerable features derived from observed volume intensities in an MR image.

Figure 1A:
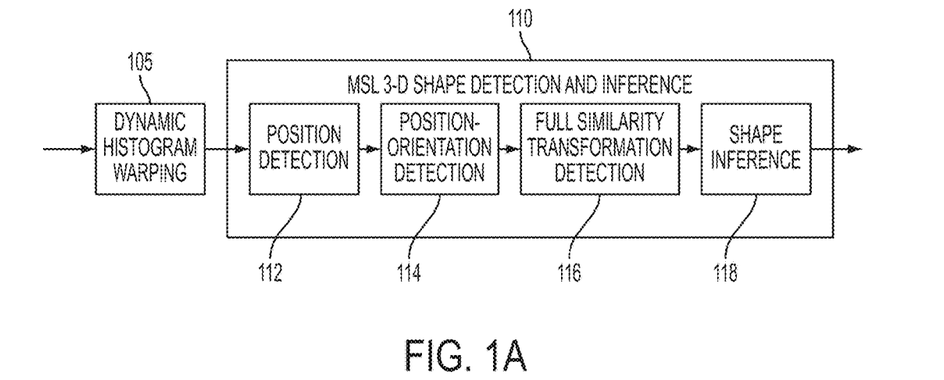
FIG. 1A illustrates a processing pipeline for detection (segmentation) of an individual sub-cortical brain structure according to an embodiment of the present invention.

FIG. 1A illustrates a processing pipeline for detection (segmentation) of an individual brain structure according to an embodiment of the present invention. The method shown in FIG. 1A can be used to individually segment each of the left and right caudate nucleus, hippocampus, globus pallidus, putamen, and amydgala. As shown in FIG. 1A, at step 105, dynamic histogram warping (DHW) is used to standardize observed MR intensities of an input 3D MR image by non-rigidly aligning a histogram of the observed MR intensities of the input image with a template histogram. At step 110, for each (sub)-cortical structure of interest, an extended MSL framework, which explicitly integrates shape inference into the overall MSL formulation, is used to detect the position, orientation, scale, and shape of the structure. In particular, the extended MSL framework includes stages of position detection (112), position-orientation detection (114), full similarity transform (position-orientation-scale) detection (116), and shape inference (118). This extended MSL framework used for individual (sub)-cortical brain structure detection is described in greater detail below.

Figure 1B:
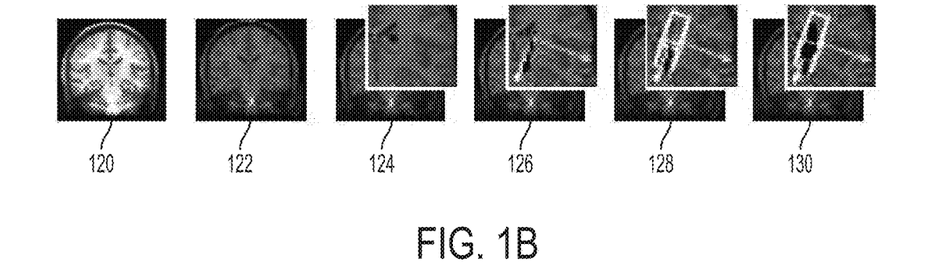
FIG. 1B illustrates results of the processing pipeline of FIG. 1A.

FIG. 1B illustrates results of the processing pipeline of FIG. 1A. In particular, FIG. 1B shows detection and delineation (segmentation) of the left caudate using the method of FIG. 1A. Image 120 is a slice of an input 3D MR image. Image 122 shows results of the dynamic histogram warping (105). Images 124, 126, 128, and 130 show results of the position detection (112), position-orientation detection (114), full similarity transformation detection (116), and shape inference (118), respectively, for the left caudate.

For combined 3D rigid anatomy detection and shape inference, an extended MSL-based framework is used. A structure of interest's center is estimated as $c=(c_1, c_2, c_3) \in \mathbb{R}^3$, orientation as $R \in SO(3)$, scale as $s=(s_1, s_2, s_3) \in \{s \in \mathbb{R}^3 | s_i > 0, i=1, 2, 3\}$, and shape as $x=(x_1, y_1, z_1, \ldots, x_n, y_n, z_n)^T \in \mathbb{R}^{3n}$. The shape parameter comprises canonically sampled 3D points $x_i=(x_i, y_i, z_i)^T \in \mathbb{R}^3$, $i \in \{1, \ldots, n\}$, on the surface of the object to be segmented. Note that R is relative to c, s is relative to c and R and x is relative to c, R, and s. Let $V=\{1, 2, \ldots, N\}$, $N \in \mathbb{N}$, be a set of indices of image voxels, $(y_v)_{v \in V}$, $y_v \in \{-1, 1\}$, a binary segmentation of the image voxels into object and non-object voxels, and f be a function with $Y=f(I, \Theta)$ that provides a binary segmentation of volume I using segmentation parameters $\Theta=(c, R, s, x)$. Let $Z=(z_\Theta)$ be a family of high dimensional feature vectors extracted from a given input volume $I=(i_v)_{v \in V}$ and associated with different discretized configurations of $\Theta$. In embodiments of the present invention, Z can include voxel-wise context encoding 3D generalized features to characterize possible object centers and steerable features that are capable of representing hypothetical orientations and optionally scaling relative to a given object center or shape surface point.

In order to detect an individual brain structure, we search for an optimal parameter vector:

$$\Theta^* \operatorname*{argmax}_{\Theta} p(y=1 | \Theta, I, M^{(\Theta)}) = \operatorname*{argmax}_{\Theta} p(y=1 | Z, M^{(\Theta)}) \quad (1)$$

maximizing the posterior probability of the presence, i.e., y=1, of the target brain structure given the discriminative model $M^{(\Theta)}$ and the features Z extracted from the input volume I using a certain set of values for the parameters $\Theta$.

Let $\pi^{(c)}(Z)$, $\pi^{(c,R)}(Z)$, $\pi^{(c,R,s)}(Z)$, and $\pi^{(c,R,s,x)}(Z)$ denote the vectors of components of Z associated with individual groups of elements (c), (c,R), (c,R,s), and (c,R,s,x) of the parameter vector $\Theta$. The MSL method avoids exhaustively searching the high-dimensional parameter space spanned by all possible $\Theta$ by exploiting the fact that ideally for any discriminative model for center detection with parameters $M^{(c)}$ working on a restricted amount of possible features, $$c^* = \operatorname*{argmax}_{c} p(y=1 | \pi^{(c)}(Z), M^{(c)}) \quad (2)$$

holds, as the object center c is invariant under relative reorientation, relative rescaling, and relative shape positioning. Similarly, we have $$R^* = \operatorname*{argmax}_{R} p(y=1 | \pi^{(c^*,R)}(Z), M^{(c,R)}) \quad (3)$$

for combined position-orientation detection with model parameters $M^{(c,R)}$, where only features $\pi^{(c^*,R)}(Z)$ with $c=c^*$ are considered. This is due to the fact that position and orientation are invariant under relative rescaling and relative shape positioning. Analogous considerations yield $$s^* = \operatorname*{argmax}_{s} p(y=1 | \pi^{(c^*,R^*,s)}(Z), M^{(c,R,s)}) \quad (4)$$

for the target object's scaling, and $$x^* = \operatorname*{argmax}_{x} p(y=1 | \pi^{(c^*,R^*,s^*,x)}(Z), M^{(c,R,s,x)}, M^{(c,R,s,x)}) \quad (5)$$

for the target object's shape where $M^{(c,R,s,x)}$ are the parameters of a local shape model with respect to individual surface points x, and parameters $M^{(c,R,s,x)}$ represent a global shape model. Equations (2)-(5) set up a chain of discriminative models exploiting search space parameter invariance for combined 3D shape detection and shape inference. This allows different discriminative models to be applied in descending order of geometrical abstraction as, in embodiments of the present invention, the object center c alone is the most geometrically abstract and the complete set of parameters $\Theta$ is the least abstract shape representation. Therefore, MSL establishes a hierarchical decomposition of the search space along decreasing levels of geometrical abstraction with increasing dimensionality of the considered parameter subspace.

Let Z be the set of annotated image volumes in their transformed feature representation as described above. Z is referred to herein as the training data. In order to detect the nine parameter similarity transformation of the optimal parameter $\Theta^*$, i.e., $c^*$, $R^*$, and $s^*$, discriminative models $P(y=1|\pi^{(c^*)}(Z))$, $P(y=1|\pi^{(c^*,R)}(Z))$, and $P(y=1|\pi^{(c^*,R^*,s)}(Z))$ are learned (trained) based on the training data. Following the concept of MSL, a set of positive and negative training examples $C=\{(\pi^{(C)}(Z),y)|Z \in Z\}$ are generated from the training data to train a probabilistic boosting tree (PBT) classifier for position detection. The feature vectors $\pi^{(C)}(Z)$ can be 3D generalized Haar-like features encoding voxel context of candidate object centers based on observed intensity values. Decreasing the level of geometric abstraction, a PBT classifier is analogously trained for combined position-orientation detection based on an extended set of training examples $G=\{(\pi^{(c,R)}(Z),y)|Z \in Z\}$, where the feature vectors $\pi^{(c,R)}(Z)$, associated with (c,R) and an image volume, are steerable features. Steerable features allow varying orientation and scaling to be encoded in terms of aligned and scaled intensity sampling patterns. According to an advantageous implementation, steerable features are also used to train a PBT classifier for full nine parameter similarly transformation detection based on an extended set of training examples $S=\{(\pi^{(c,R,s)}(Z),y)|Z\epsilon Z\}$, where $\pi^{(c,R,s)}(Z)$ is derived from (c, R, s) and the associated image volume.

In order to detect the final object shape for each individual brain structure, we further decompose $$\pi^{(c,R,s,x)}(Z)=(\pi^{(c,R,s,x_i,y_i,z_i)}(Z))_{i=1,\ldots,n}$$

where $\pi^{(c,R,s,x_i,y_i,z_i)}(Z)$ are the features associated with an image volume and individual relatively aligned candidate points (c, R, s, $x_i$, $y_i$, $z_i$) for the surface of the object of interest. In order to apply discriminative modeling, we assume the $(x_i, y_i, z_i)^T$ and correspondingly $\pi^{(c,R,s,x_i,y_i,z_i)}(Z)$ to be independently and identically distributed (i.i.d.), and approximate $$x^* = \underset{x}{\operatorname{argmax}}\, p(y=1\mid \pi^{(c^*,R^*,s^*,x)}(Z), M^{(c,R,s,x)}, M^{(c,R,s,x)}) \quad (6)$$

$$\approx \underset{x}{\operatorname{argmax}}\left[\prod_{i=1}^{n} p(y_i=1\mid \pi^{(c^*,R^*,s^*,x_i,y_i,z_i)}(Z), M^{(c,R,s,x)})\right].$$

$$p(x\mid c^*, R^*, s^*, M^{(c,R,s,x)})$$

in an iterative manner. The term $p(y_i=1|\pi^{(c,R,s,x_i,y_i,z_i)}(Z))$ describes the probability that the relatively aligned point (c, R, s, $x_i$, $y_i$, $z_i$) is part of the shape to be inferred, i.e., lies on the surface of the target structure, and p(x|c*, R*, s*, $M^{(c,R,s,x)}$) is a global shape model. The probability $p(y_i=1|\pi^{(c,R,s,x_i,y_i,z_i)}(Z)$ is estimated with a PBT classifier using steerable features trained on training examples X= $\{(\pi^{(c,R,s,x_i,y_i,z_i)}(Z), y)|i=1, \ldots, n; Z\epsilon Z\}$. An iterative approach can be used to minimize Equation (6) as, in practice, x=($x_1$, $y_1$, $z_1$, . . . , $x_n$, $y_n$, $z_n$)$\in IR^{3n}$ only varies around the mean shape positioned relatively to the previously detected similarity transformation (c*,R*,s*) at time t=0 and the previous most likely shape in each iteration t=1, . . . , T.

The global shape model can be implemented as an active shape model (ASM), which can be used to incorporate prior shape during segmentation. Active shape models are described in detail in Cootes et al. "Active Shape Models-Their Training and Application" Comp. Vis. Image Understand. 61(1) (January 1995), pgs. 38-59, which is incorporated herein by reference. In an ASM, the shape of a target structure is represented as a cloud of points, which are either manually or automatically placed at certain characteristic locations within the class of images to be processed. Once these sets of labeled point features, or landmarks, are established for each image, they are linearly aligned to each other in order to remove translation, rotation, and scaling as far as possible. This can be done using the generalized Procrustes analysis (GPA), which is well known and described in detail in Gower "Generalized Procrustes Analysis" Psychmetrika 40(1) (March 1975), pgs. 33-50, which is incorporated herein by reference. After the GPA all the shapes are transformed to a common coordinate system— the model space of the ASM. The remaining variability can be described as a prior model using a Point Distribution Model (PDM).

Figure 2:
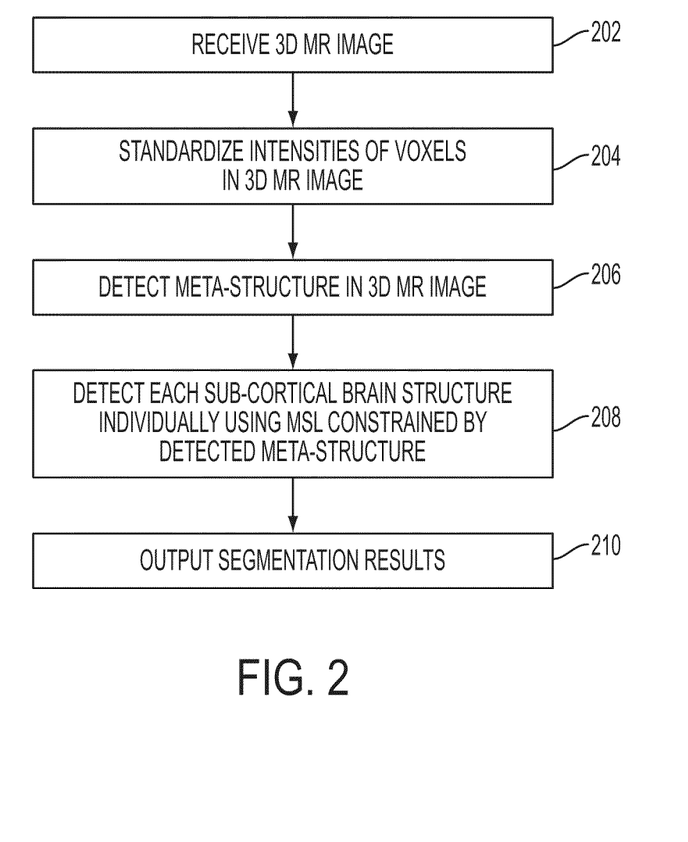
FIG. 2 illustrates a method of segmenting multiple brain structures in a 3D MR image according to an embodiment of the present invention.

As described above, MSL-based detection can be used to separately segment each individual (sub)-cortical brain structure. However, using MSL for rigid detection of each brain structure independently may not be optimal. Accordingly, embodiments of the present invention take advantage of an inherent relationship between the positions of the (sub)-cortical brain structures (left and right caudate nucleus, hippocampus, globus pallidus, putamen, and amydgala) during the segmentation of the brain structures. FIG. 2 illustrates a method of segmenting multiple brain structures in a 3D MR image according to an embodiment of the present invention. The method of FIG. 2 transforms 3D MR data representing a patient's brain to detect and segment various (sub)-cortical brain structures in the 3D MR data. In particular, the method of FIG. 2 segments the (sub)-cortical brain structures of left and right caudate nucleus, left and right hippocampus, left and right globus pallidus, left and right putamen, and left and right amydgala in a 3D MR image.

Referring to FIG. 2, at step 202, a 3D MR image is received. The 3D MR image (volume) can be received directly from an MRI scanning device, or can be a previously stored 3D MR image loaded from memory or storage of a computer system, or some other computer readable medium. According to an advantageous implementation, the 3D MR image may be a T1-weighted 3D MR brain scan.

At step 204, the voxel intensities of the received 3D MR image are standardized. This intensity standardization allows the segmentation method of FIG. 2 to be performed reliably on 3D MR images result from MR brain scans from different scanners and sites. According to an advantageous implementation, dynamic histogram warping (DHW) can be used to standardize the voxel intensities of the 3D MR image. DHW standardizes the observer MR intensities by non-rigidly aligning a histogram of the observed intensities in the 3D MR image to a template histogram. DHW is described in detail in Cox et al., "Dynamic Histogram Warping of Image Pairs for Constant Image Brightness", IEEE Int. Conf. on Image Proc., Vol. II, October 1995, 366-369, which is incorporated herein by reference.

At step 206, a meta-structure including positions of each of the target (sub)-cortical brain structures is detected in the 3D MR image. The meta-structure is a composition of all of the target brain structures, and can be generated based on mean positions of the brain structures in the training data. The meta-structure can be a 3D shape that includes center locations of each of the target (sub)-cortical brain structures. Accordingly, the detection of the location, orientation, and scale of the meta-structure in the 3D MR image results in an estimate for the center position of each of the individual (sub)-cortical brain structure. According to an embodiment of the present invention, the meta-structure can be detected using marginal space learning to sequentially detect position, position-orientation, and a full similarity transformation of its associated 3D shape. For each stage of the marginal space learning detection, a discriminative PBT classifier can be trained based on training data.

Figure 3:
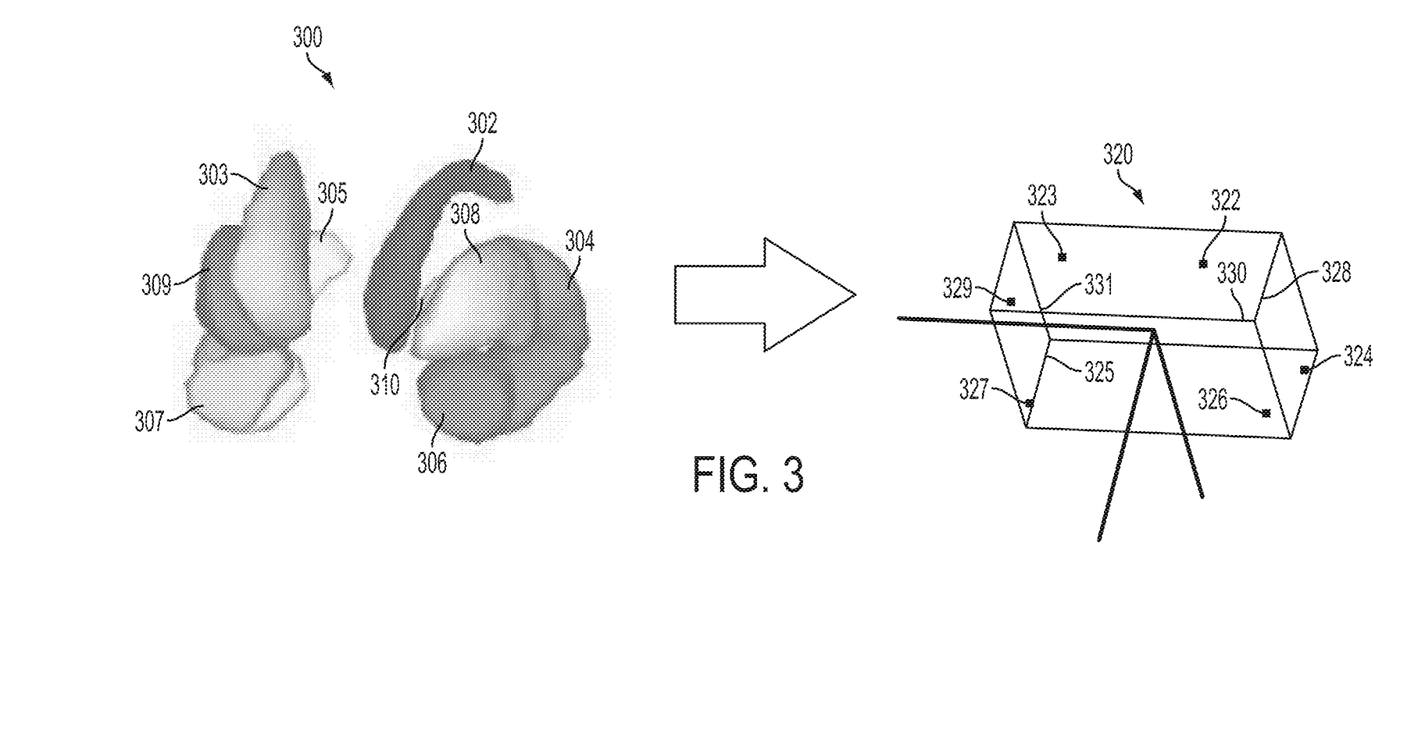
FIG. 3 illustrates a composition of a meta-structure including multiple sub-cortical and cortical brain structures with its associated center, orientation, and scaling according to an embodiment of the present invention.

FIG. 3 illustrates a composition of a meta-structure including multiple (sub)-cortical brain structures according to an embodiment of the present invention. As illustrated in FIG. 3, image 300 shows the following (sub)-cortical brain structures of the left caudate nucleus 302, right caudate nucleus 303, left hippocampus 304, right hippocampus 305, left amydgala 306, right amydgala 307, left putamen 308, and right putamen 309 generated based on annotated training data. The left globus pallidus 310 is visible in image 300 between the left caudate nucleus 302 and the left putamen 308, and the right globus pallidus is hidden in image 300 by the right caudate nucleus 303. These structures are combined in the meta-structure 320 which includes center positions for the left caudate nucleus 322, right caudate nucleus 323, left hippocampus 324, right hippocampus 325, left amydgala 326, right amydgala 327, left putamen 328, right putamen 329, left globus pallidus 330 and right globus pallidus 331.

The meta-structure detection exploits the relationship between the positions of the multiple (sub)-cortical brain structures to speed up detection and delineation of (sub)-cortical brain structures. Let N∈IN⁺ be the number of target structures to be detected. Their hierarchical shape representation is a shape $(s_i, R_i, t_i, X_i)$ for $i \in \{1, \ldots, N\}$. A meta-structure $(\hat{s}, \hat{R}, \hat{t}, \hat{X})$ is defined with $$\hat{X} = (t_{1_1}, t_{1_2}, t_{1_3}, \ldots, t_{N_1}, t_{N_2}, t_{N_3})^T, \quad (7)$$

and $\hat{s}, \hat{R}$, and $\hat{t}$ estimated based on $\hat{X}$ via principal component analysis (PCA). This definition of the meta-structure enables the training of a chain of discriminative models (e.g., PBT classifiers) for rigid meta-structure detection similar to the rigid detection of any other individual (sub)-cortical brain structure as described above. Using GPA, a population meta-structure mean shape can be generated based on the annotated training data. Instead of iteratively adapting an initial shape, i.e., the mean shape, after it has been rigidly positioned according to the rigid detection result $(\hat{s}^*, \hat{R}^*, \hat{t}^*)$, as done for the shape inference described above, the initial estimate of $\hat{X}^*$ is used to constrain subsequent position detection steps for individual (sub)-cortical brain structures. In particular, position detection for each individual (sub)-cortical brain structure is performed exclusively on candidate voxels that wall within a certain radius of the corresponding meta-structure mean shape points $\hat{x}_i^*$, $i \in \{1, \ldots, m\}$.

Returning to FIG. 2, at step 208 each (sub)-cortical brain structure is individually segmented using MSL constrained by the detected meta-structure. In particular each of the (sub)-cortical brain structures (e.g., left and right caudate nucleus, left and right hippocampus, left and right globus pallidus, left and right putamen, and left and right amygdala) is individually segmented using the extended MSL with shape inference detection described above. The extended MSL framework is illustrated as 110 in FIG. 1A and includes, for each brain structure, position detection (112), position-orientation detection (114), full similarity transformation (i.e., position-orientation-scale) detection (116), and shape inference (118) using a set of trained discriminative (e.g., PBT) classifiers. However, for each (sub)-cortical brain structure, the position detection is constrained to voxels in the 3D MR image within a certain radius of the center position of that brain structure in the detected meta-structure. This significantly reduces the search space for the position detection of each (sub)-cortical brain structure. Accordingly, the trained position classifier for a particular brain structure searched voxels of the 3D MR image within the certain radius of the center point of that structure in the detected meta-structure to detect a number of position candidates for that brain structure.

The position-orientation detection, full similarity transformation detection, and shape inference for each brain structure then proceeds as described above. In particular, a set of position-orientation hypotheses are generated based on the detected position candidates, and the trained position-orientation classifier detects a number of position-orientation candidates from the position-orientation hypotheses. A set of similarity transformation hypotheses are generated based on the detected position-orientation candidates, and the trained position-orientation classifier is used to detect the best similarity transformation from the similarity transformation candidates. The shape of the detected structure is then iteratively adjusted using the trained shape inference classifier, as described above.

Returning to FIG. 2, at step 210, the segmented (sub)-cortical brain structures are output. For example, the segmented (sub)-cortical brain structures can be output by displaying the segmentation results on a display of a computer system, or other display device. It is also possible that the segmentation results can be output by storing the segmentation results, for example, on a storage or memory of a computer system or on a computer readable medium.

Figure 4:
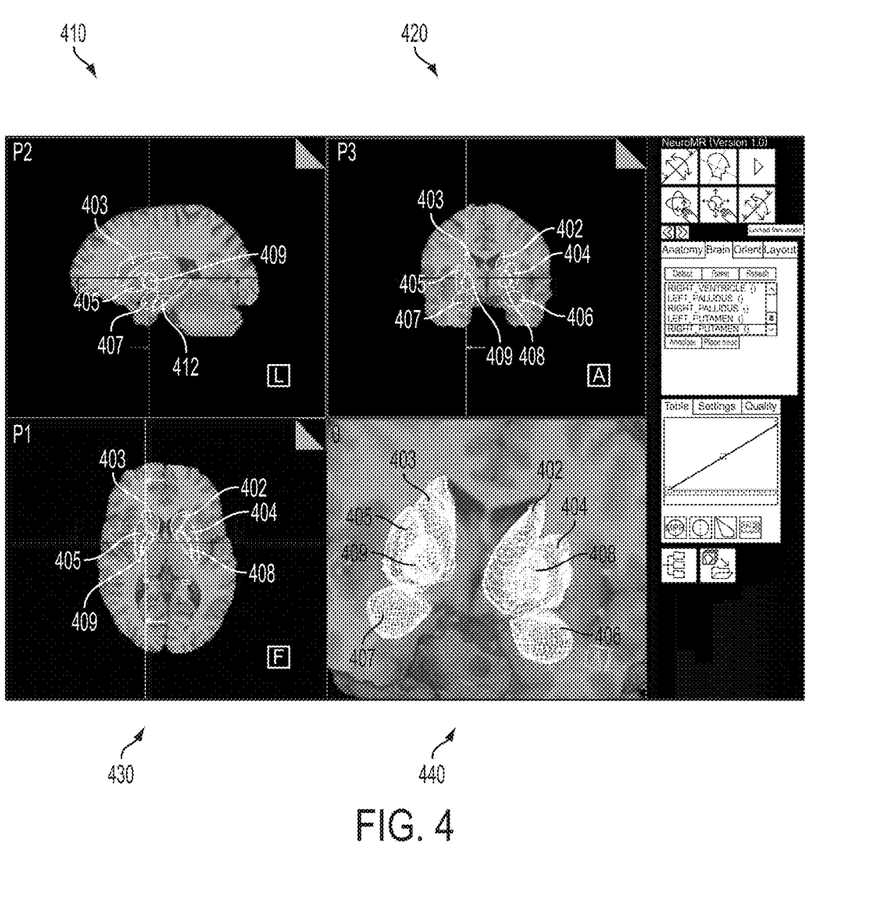
FIG. 4 illustrates exemplary brain structure segmentation results segmented using the method of FIG. 2.

FIG. 4 illustrates exemplary (sub)-cortical brain structure segmentation results segmented using the method of FIG. 2. As illustrated in FIG. 4, images 410, 420, and 430 are 2D slices showing different views of a 3D MR image and image 440 is a 3D rendering of the 3D MR image. Images 410, 420, 430 and 440 show segmentation results for the left caudate nucleus 402, right caudate nucleus 403, left putmen 404, right putamen 405, left amydgala 406, right amydgala 407, left globus pallidus 408, and globus pallidus 409 segmented using the method of FIG. 2. The right hippocampus 412 is visible in image 410.

Figure 5:
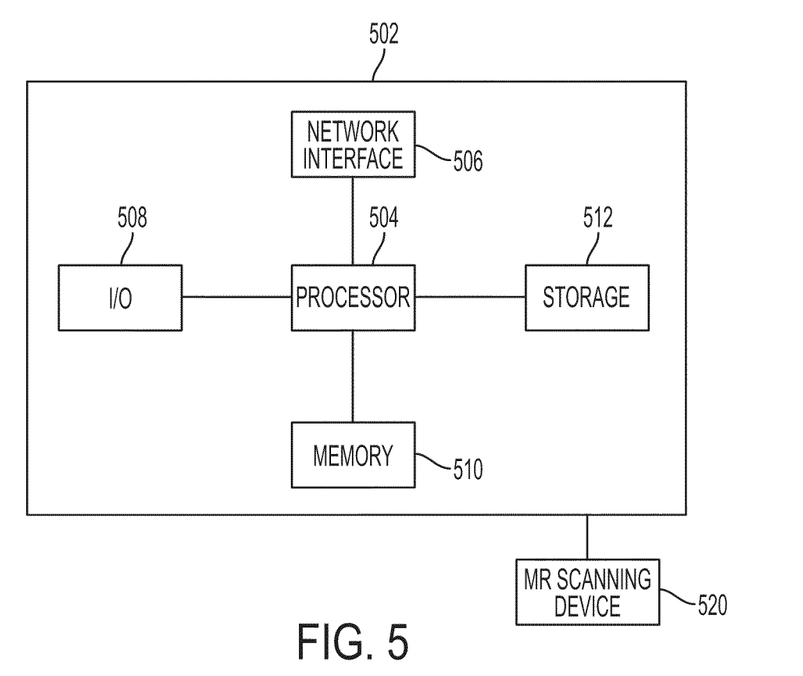
FIG. 5 is a high level block diagram of a computer capable of implementing the present invention.

The above-described methods for segmenting multiple (sub)-cortical brain structures in 3D MR images may be implemented on a computer using well-known computer processors, memory units, storage devices, computer software, and other components. A high level block diagram of such a computer is illustrated in FIG. 5. Computer 502 contains a processor 504 which controls the overall operation of the computer 502 by executing computer program instructions which define such operation. The computer program instructions may be stored in a storage device 512, or other computer readable medium (e.g., magnetic disk, CD ROM, etc.) and loaded into memory 510 when execution of the computer program instructions is desired. Thus, the steps of the method of FIG. 2 may be defined by the computer program instructions stored in the memory 510 and/or storage 512 and controlled by the processor 504 executing the computer program instructions. An MR scanning device 520 can be connected to the computer 502 to input the multi-spectral MR images to the computer 502. It is possible to implement the MR scanning device 520 and the computer 502 as one device. It is also possible that the MR scanning device 520 and the computer 502 communicate wirelessly through a network. The computer 502 also includes one or more network interfaces 506 for communicating with other devices via a network. The computer 502 also includes other input/output devices 508 that enable user interaction with the computer 502 (e.g., display, keyboard, mouse, speakers, buttons, etc.). One skilled in the art will recognize that an implementation of an actual computer could contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for segmenting a plurality of brain structures in a 3D magnetic resonance (MR) image, comprising:
   detecting a meta-structure including center positions of each of said plurality of brain structures in the 3D MR image; and
   individually segmenting at least one of the plurality of brain structures using marginal space learning (MSL) constrained by the detected meta-structure, wherein said step of detecting a meta-structure comprises:
      detecting the meta-structure using MSL to sequentially detect position, position-orientation, and a full similarity transformation of the meta-structure in the 3D MR image using a set of trained discriminative classifiers.

2. The method of claim 1, further comprising:
   standardizing voxel intensities of the 3D MR image prior to said step of detecting a meta-structure.

3. The method claim 2, wherein said step of standardizing voxel intensities of the 3D MR image comprises:
   standardizing the voxel intensities of the 3D MR image using dynamic histogram warping (DHW).

4. The method of claim 1, wherein said step of individually segmenting at least one of the plurality of brain structures comprises: individually segmenting each of the plurality of brain structures using MLS constrained by the detected meta-structure.

5. The method of claim 1, wherein the meta-structure is generated based on shapes of each of the plurality of brain structures in annotated training data.

6. The method of claim 1, wherein said step of individually segmenting at least one of the plurality of brain structures using marginal space learning (MSL) constrained by the detected meta-structure comprises:
   detecting position candidates for said at least one of the plurality of brain structures in search space in the 3D MR image constrained based on the detected meta-structure using a trained position classifier;
   detecting position-orientation candidates for at least one of the plurality of brain structures based on said detected position candidates using a trained position-orientation classifier;
   detecting a full similarity transformation for said at least one of the plurality of brain structures based on said detected position-orientation candidates using a trained similarity transformation classifier; and
   adjusting a shape of the detected at least one of the plurality of brain structures using iterative shape inference using a trained shape classifier.

7. The method of claim 6, wherein the search space for said step of detecting position candidates is constrained to a certain radius of voxels surrounding the center position of said at least one of the plurality of brain structures in the detected meta-structure.

8. The method of claim 6, wherein the trained position classifier, trained position-orientation classifier, trained similarity transformation classifier, and the trained shape classifier are probabilistic boosting tree (PBT) classifiers.

9. The method of claim 1, wherein said plurality of brain structures comprises a plurality of sub-cortical and cortical brain structures.

10. The method of claim 1, wherein said plurality of brain structures comprises a left caudate nucleus, right caudate nucleus, left hippocampus, right hippocampus, left globus pallidus, right globus pallidus, left putamen, right putamen, left amydgala, and right amydgala.

11. An apparatus for segmenting a plurality of brain structures in a 3D magnetic resonance (MR) image, comprising:
    means for detecting a meta-structure including center positions of each of said plurality of brain structures in the 3D MR image; and
    means for individually segmenting at least one of the plurality of brain structures using marginal space learning (MSL) constrained by the detected meta-structure, wherein said means for detecting a meta-structure comprises:
       means for detecting the meta-structure using MSL to sequentially detect position, position-orientation, and a full similarity transformation of the meta-structure in the 3D MR image using a set of trained discriminative classifiers.

12. The apparatus of claim 11, further comprising:
    means for standardizing voxel intensities of the 3D MR image.

13. The apparatus of claim 11, wherein the meta-structure is generated based on shapes of each of the plurality of brain structures in annotated training data.

14. The apparatus of claim 11, wherein said means for individually segmenting at least one of the plurality of brain structures using marginal space learning (MSL) constrained by the detected meta-structure comprises:
    means for detecting position candidates for said at least one of the plurality of brain structures in search space in the 3D MR image constrained based on the detected meta-structure using a trained position classifier;
    means for detecting position-orientation candidates for at least one of the plurality of brain structures based on said detected position candidates using a trained position-orientation classifier;
    means for detecting a full similarity transformation for said at least one of the plurality of brain structures based on said detected position-orientation candidates using a trained similarity transformation classifier; and
    means for adjusting a shape of the detected at least one of the plurality of brain structures using iterative shape inference using a trained shape classifier.

15. The apparatus of claim 14, wherein the search space for detecting position candidates is constrained to a certain radius of voxels surrounding the center position of said at least one of the plurality of brain structures in the detected meta-structure.

16. The apparatus of claim 14, wherein the trained position classifier, trained position-orientation classifier, trained similarity transformation classifier, and the trained shape classifier are probabilistic boosting tree (PBT) classifiers.

17. The apparatus of claim 11, wherein said plurality of brain structures comprises a left caudate nucleus, right caudate nucleus, left hippocampus, right hippocampus, left globus pallidus, right globus pallidus, left putamen, right putamen, left amydgala, and right amydgala.

18. A non-transitory computer readable medium encoded with computer executable instructions for segmenting a plurality of brain structures in a 3D magnetic resonance (MR) image, the computer executable instructions defining steps comprising:
    detecting a meta-structure including center positions of each of said plurality of brain structures in the 3D MR image; and
    individually segmenting at least one of the plurality of brain structures using marginal space learning (MSL) constrained by the detected meta-structure, wherein the computer executable instructions defining the step of detecting a meta-structure comprise computer executable instructions defining the step of:

detecting the meta-structure using MSL to sequentially detect position, position-orientation, and a full similarity transformation of the meta-structure in the 3D MR image using a set of trained discriminative classifiers.

19. The non-transitory computer readable medium of claim 18, further comprising computer executable instructions defining the step of:

standardizing voxel intensities of the 3D MR image prior to said step of detecting a meta-structure.

20. The non-transitory computer readable medium of claim 18, wherein the meta-structure is generated based on shapes of each of the plurality of brain structures in annotated training data.

21. The non-transitory computer readable medium of claim 18, wherein the computer executable instructions defining the step of individually segmenting at least one of the plurality of brain structures using marginal space learning (MSL) constrained by the detected meta-structure comprise computer executable instructions defining the steps of:

detecting position candidates for said at least one of the plurality of brain structures in search space in the 3D MR image constrained based on the detected meta-structure using a trained position classifier;

detecting position-orientation candidates for at least one of the plurality of brain structures based on said detected position candidates using a trained position-orientation classifier;

detecting a full similarity transformation for said at least one of the plurality of brain structures based on said detected position-orientation candidates using a trained similarity transformation classifier; and adjusting a shape of the detected at least one of the plurality of brain structures using iterative shape inference using a trained shape classifier.

22. The non-transitory computer readable medium of claim 21, wherein the search space for said step of detecting position candidates is constrained to a certain radius of voxels surrounding the center position of said at least one of the plurality of brain structures in the detected meta-structure.

23. The non-transitory computer readable medium of claim 21, wherein the trained position classifier, trained position-orientation classifier, trained similarity transformation classifier, and the trained shape classifier are probabilistic boosting tree (PBT) classifiers.

24. The non-transitory computer readable medium of claim 18, wherein said plurality of brain structures comprises a left caudate nucleus, right caudate nucleus, left hippocampus, right hippocampus, left globus pallidus, right globus pallidus, left putamen, right putamen, left amydgala, and right amydgala.

* * * * *